United States Patent
Green

(10) Patent No.: US 10,417,941 B1
(45) Date of Patent: Sep. 17, 2019

(54) ROTATION CANCELLING WHEEL MOUNTED DISPLAY

(71) Applicant: Douglas W. Green, Las Vegas, NV (US)

(72) Inventor: Douglas W. Green, Las Vegas, NV (US)

(*) Notice: Subject to any disclaimer, the term of this patent is extended or adjusted under 35 U.S.C. 154(b) by 64 days.

(21) Appl. No.: 15/708,403

(22) Filed: Sep. 19, 2017

(51) Int. Cl.
| | |
|---|---|
| *G09F 21/04* | (2006.01) |
| *B60B 7/20* | (2006.01) |
| *B60R 16/03* | (2006.01) |
| *B60B 7/06* | (2006.01) |
| *B60B 7/14* | (2006.01) |
| *B60B 7/00* | (2006.01) |
| *G09F 7/22* | (2006.01) |
| *G09F 13/04* | (2006.01) |
| *G09F 9/30* | (2006.01) |
| *B60R 16/033* | (2006.01) |
| *G09F 7/18* | (2006.01) |

(52) U.S. Cl.
CPC ............ *G09F 21/045* (2013.01); *B60B 7/006* (2013.01); *B60B 7/068* (2013.01); *B60B 7/14* (2013.01); *B60B 7/20* (2013.01); *B60R 16/03* (2013.01); *B60R 16/033* (2013.01); *G09F 7/22* (2013.01); *G09F 9/30* (2013.01); *G09F 13/04* (2013.01); *G09F 2007/1865* (2013.01); *G09F 2013/044* (2013.01)

(58) Field of Classification Search
CPC .......... G09F 21/045; G09F 9/30; G09F 13/04; G09F 7/22; G09F 2007/1865; G09F 2013/044; B60R 16/033; B60R 16/03; B60B 7/006; B60B 7/20; B60B 7/14; B60B 7/068

USPC ....................................................... 301/37.25
See application file for complete search history.

(56) References Cited

U.S. PATENT DOCUMENTS

| | | | | |
|---|---|---|---|---|
| 5,659,989 | A | * | 8/1997 | Hsiao .................... G09F 21/045 301/37.109 |
| 6,857,709 | B1 | * | 2/2005 | McLean .................... B60B 7/20 301/37.105 |
| 2005/0121968 | A1 | * | 6/2005 | McCaster, III ........... B60B 7/20 301/37.25 |
| 2006/0028059 | A1 | * | 2/2006 | Choe ........................ B60B 7/20 301/108.1 |

(Continued)

OTHER PUBLICATIONS

LED Car Wheel Light with 50 Styles Patterns or DIY Logo by Yourself IPX6 Sale, Banggood.com, https://www.banggood.com/LED-Q1-Version-Car-Programmable-Wheel-Light-40-LED-50-Patterns-DIY-Flash-Animation-p-1020143.html, 2016 (Retrieved Oct. 4, 2017).

(Continued)

*Primary Examiner* — S. Joseph Morano
*Assistant Examiner* — Jean W Charleston
(74) *Attorney, Agent, or Firm* — Lightbulb IP, LLC

(57) ABSTRACT

A wheel mounted display provides one or more presentations at one or more wheels of a vehicle. The presentations may provide advertising, informational, or other material, and are maintained in an upright position even while the vehicle is in motion. The wheel mounted display comprises a display showing one or more presentations may be rotatably attached to a wheel. A ballast is provided to aid in maintaining an upright position for the presentations. A mount allows attachment to a variety of wheels without requiring modification of the wheels.

20 Claims, 6 Drawing Sheets

(56) References Cited

U.S. PATENT DOCUMENTS

| | | | |
|---|---|---|---|
| 2006/0214500 A1* | 9/2006 | Hall | B60B 1/06 |
| | | | 301/95.102 |
| 2007/0200421 A1* | 8/2007 | DoVale, Jr. | B60B 7/20 |
| | | | 301/37.25 |
| 2009/0015057 A1* | 1/2009 | Groomes | B60B 7/20 |
| | | | 301/37.108 |
| 2013/0187921 A1* | 7/2013 | Gilbert | B60K 35/00 |
| | | | 345/426 |
| 2014/0267458 A1* | 9/2014 | Fisher | B60B 7/00 |
| | | | 345/690 |

OTHER PUBLICATIONS

Green LED Wheel Lights Rim Lights Rings by Oracle (Set of 4) for Pontiac Model 1, ebay.com, http://www.ebay.com/itm/GREEN-LED-Wheel-Lights-Rings-by-ORACLE-Set-of-4-for-PONTIAC-MODEL-1-/311911434254, Jul. 31, 2017 (Retrieved Oct. 4, 2017).

* cited by examiner

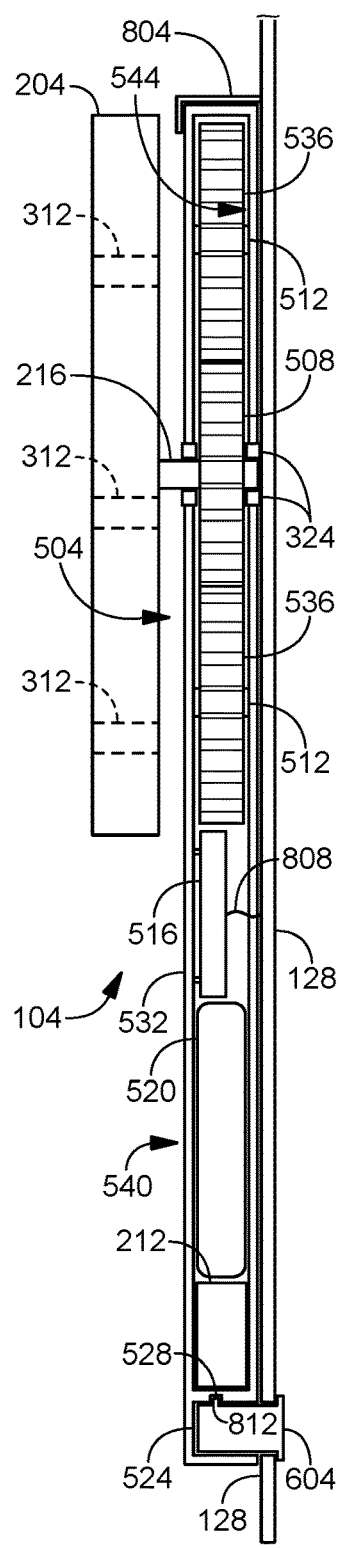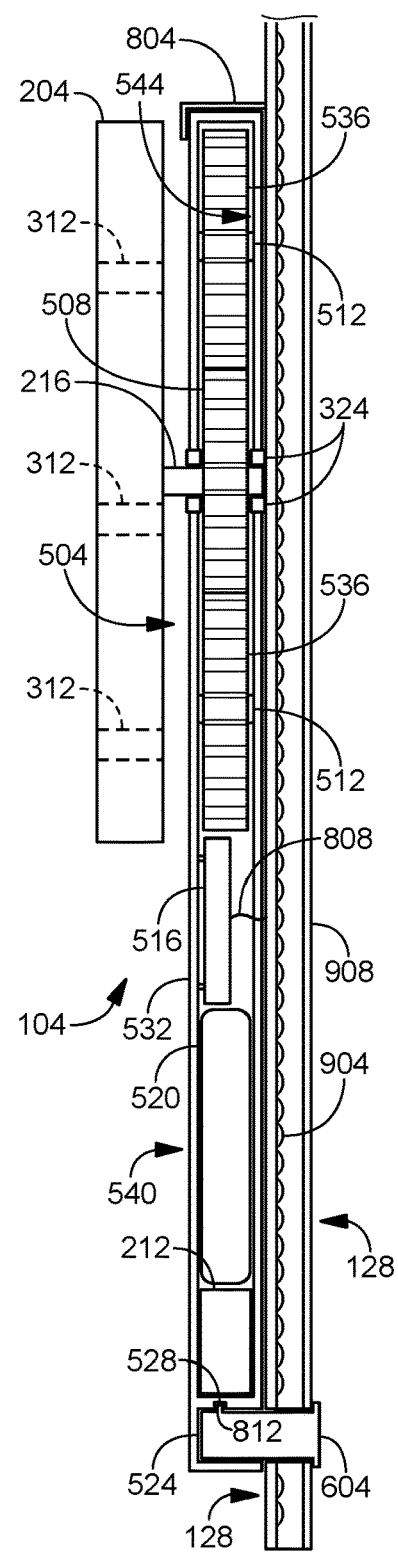
*FIG. 8*  *FIG. 9*

ROTATION CANCELLING WHEEL MOUNTED DISPLAY

BACKGROUND OF THE INVENTION

Field of the Invention

The invention relates to vehicular displays and in particular to a rotation cancelling wheel mounted display.

Related Art

Outdoor advertising or signage is desirable for various reasons. Depending on its location, such advertising or signage is typically visible to a significant portion of an area's population and may be seen repeatedly to increase and reinforce awareness. In addition, outdoor advertising or signage typically remains present for continuous periods of time, increasing its exposure to various portions of a population.

From the discussion that follows, it will become apparent that the present invention addresses the deficiencies associated with the prior art while providing numerous additional advantages and benefits not contemplated or possible with prior art constructions.

SUMMARY OF THE INVENTION

A wheel mounted display is disclosed herein. As will be disclosed in further detail herein, a wheel mounted display maintains one or more presentations in an upright position even while a vehicle is in motion. Presentations may include advertising, informational, or other materials. A wheel mounted display advantageously allows presentations to be mobile, such as to enhance exposure and retention of the same. Also, a wheel mounted display is easily attached to and removed from a variety of wheels, without requiring modification of the wheels.

Various embodiments of the wheel mounted display are disclosed herein. For instance, in one exemplary embodiment, a wheel mounted display that mounts to a vehicle's wheel is disclosed. The wheel mounted display comprises a planar mount comprising a plurality of holes, a pivot extending from the planar mount, and a display that shows one or more presentations. The display is rotatably attached to the planar mount by the pivot, and the plurality of holes are aligned with lug bolt holes in the wheel. One or more weights ballast the display to an upright position.

The display may be sized to cover substantially all of the wheel. The wheel mounted display may also include one or more batteries, one or more screens, one or more lighting devices, or various subsets thereof. One or more generators rotatably coupled to the pivot to generate electricity when the wheel is in rotation. A plurality of spacers may be installed between the planar mount and the wheel when the wheel mounted display is attached to the wheel.

In another exemplary embodiment, a wheel mounted display for mounting to a wheel comprises a mount comprising one or more holes aligned with one or more lug bolt holes of the wheel, a display that shows one or more presentations, and a pivot extending from the mount, wherein the pivot rotatably attaches the display to the mount. The display comprising a top end and a bottom end and is heavier at its bottom end.

One or more threaded fasteners comprising an enlarged head with a threaded hole therein may be inserted in the holes of the mount to attach the wheel mounted display to the wheel. A plurality of spacers may be between the planar mount and the wheel when the wheel mounted display is attached to the wheel.

Similarly to the above embodiment, the wheel mounted display may include one or more batteries. The display may have one or more lighting devices powered by the batteries. Alternatively or in addition, the display may have one or more screens powered by the batteries. The display may be sized to cover substantially all of the wheel.

Various methods relating to the wheel mounted display are disclosed herein as well. For instance, in one embodiment a method for providing one or more presentations at a wheel of a vehicle with a wheel mounted display is disclosed. The method comprises providing a display for showing the presentations, and rotatably attaching a mount to the display via a pivot. The display comprises a top end and a bottom end and is heavier at the bottom end. The mount comprises a plurality of holes that are aligned with one or more lug bolt holes in the wheel. One or more threaded fasteners comprising that are inserted into the plurality of holes and the lug bolt holes when the mount is attached to the wheel.

The display may be sized to cover substantially all of the wheel. One or more batteries that are charged by one or more generators may be provided as well. The generators may be rotatably coupled to the pivot. The display may comprise one or more lighting devices, one or more screens, or both. In addition, one or more spacers may be provided. The spacers may be positioned between the mount and the wheel when the mount is attached to the wheel.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is a side cross-sectional view of an exemplary wheel mounted display;

FIG. 9 is a side cross-sectional view of an exemplary wheel mounted display.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The wheel mounted display provides a medium upon which advertising or other information can be presented. As will be described further herein, the wheel mounted display will typically include a rotation cancelling mount that maintains the display in a level or horizontal position even when a vehicle's wheels are rotating. In addition, the wheel mounted display can be installed on a variety of wheels without the need to modify the wheels. This allows the wheel mounted display to be readily removable and installed on various vehicles within a fleet, while being completely reversible without modification to a vehicle. The wheel mounted display also provides a number of other advantages, which will become apparent from the disclosure herein.

Vehicular advertising provides the advantages of outdoor advertising, while also being mobile. For instance, vehicular advertising can be deployed consistently in a predefined area, along a predefined route, or in other areas or routes as desired, such as to seek exposure in a particular area or with one or more particular demographics. With mobility, an advertiser can increase and reinforce awareness according to their specific preferences. The wheel mounted display allows advertising or other information to be readily changed as needed as well.

Figure 1:
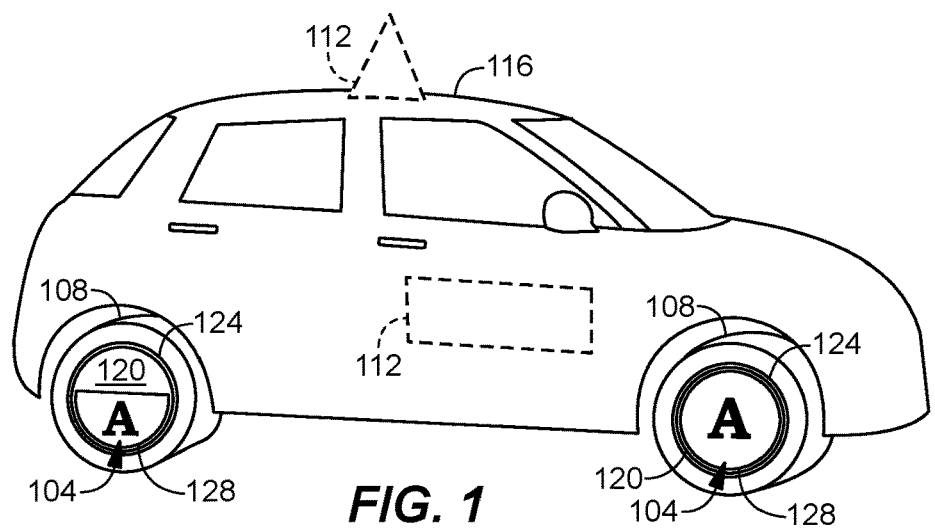
FIG. 1 is a perspective view of exemplary wheel mounted displays in an environment of use.

FIG. 1 illustrates exemplary wheel mounted displays 104 in an environment of use. Namely, in this example, wheel mounted displays 104 are installed on the wheels 120 of a vehicle 116. As can be seen, a wheel 120 may comprise a rim 124 for supporting a tire 108. Advantageously, a vehicle 116 with a wheel mounted display 104 may still provide traditional advertising 112 at other locations of a vehicle.

In one or more embodiments, a wheel mounted display 104 will substantially cover a wheel, providing an amply sized display 128. As shown in FIG. 1 for example, the rear wheel 120 is approximately half covered by the display 128, and the front wheel is nearly fully covered by the display. The "A" presented on the display 128 is for illustrative purposes only. A variety of advertising, decoration, information, or other presentation may be provided via a display 128. As will be described further below, a wheel mounted display 104 will cancel out the rotation of a vehicle's wheel 120 such that the display 128 will be maintained in an upright position even when the vehicle 116 is in motion.

A display 128 may provide a presentation at one or more wheels 120 of a vehicle that may be static or dynamic. For example, a display 128 may provide a surface or medium upon which a presentation may be applied. In such an embodiment, the presentation may be printed on or applied/adhered to the display 128 for example. In another embodiment, a display 128 may be an electronic screen, such as an LED, LCD, OLED, E-INK, or other screen that is capable of dynamically changing its content.

In one or more embodiments, a display 128 may comprise a planar rigid structure. A display 128 may be formed from plastic, metal, composite or other materials. In some embodiments, a display 128 may have a three-dimensional surface, such as a surface that is embossed or debossed according to a presentation thereon.

Figure 2:
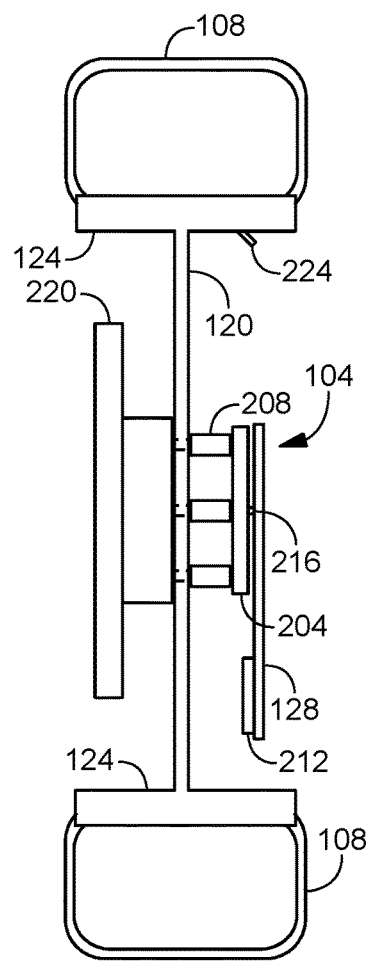
FIG. 2 is a side cross sectional view of an exemplary wheel mounted display in an environment of use.

FIG. 2 illustrates a side cross-sectional view of an exemplary wheel mounted display 104 attached to a wheel 120. As can be seen, a wheel mounted display 104 may comprise a mount 204 and a display 128. In general, a mount 204 supports a display 128 and attaches a wheel mounted display 104 to a wheel 120. A mount 204 will typically allow attachment of a wheel mounted display 104 without modification of a wheel 120 or other component of a vehicle. As shown in FIG. 2 for example, a mount 204 may utilize existing mounting structures to secure a wheel mounted display 104 to a wheel 120. Specifically, a mount 204 may utilize the existing lug fasteners, namely, lug bolt holes, lug bolts or both, of a vehicle's wheels 120 and hubs 220 to attach a wheel mounted display 104 to a wheel 120.

Figure 3A:
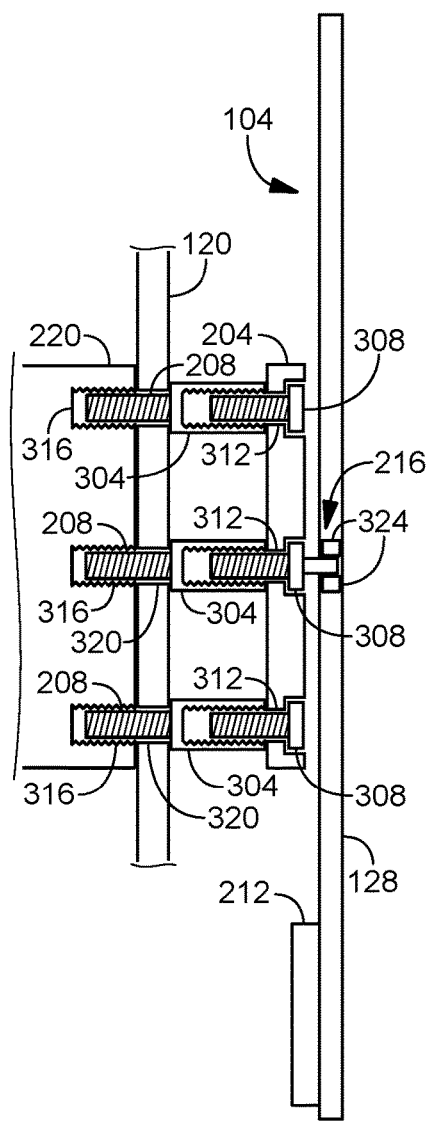
FIG. 3A is a side cross-sectional view of an exemplary wheel mounted display.

As shown in FIG. 3A for example, a mount 204 is attached to a wheel 120 via existing lug bolt holes 316 in a hub 220. Threaded fasteners 208 may be inserted into one or more of the lug bolt holes 316 and tightened to secure the mount 204. The threaded portion of a threaded fastener 208 will be formed or selected so as to be compatible with the threading of existing lug bolt holes 316. As can be seen, the threaded fasteners 208 may pass through corresponding holes 320 in a wheel 120. The lug bolt holes 316 and corresponding holes 320 will typically be existing structures for mounting a wheel 120 to a hub 220.

A threaded fastener 208 will typically have an enlarged portion or head opposite its threaded portion. The enlarged portion allows the fastener 208 to apply pressure on a surface. As can be seen in FIG. 3A, the enlarged portion of the fasteners 208 clamps the wheel 120 to the hub 220 when the fasteners are tightened to the hub. The enlarged portion may have a hexagonal or other polygonal shape in one or more embodiments to facilitate its rotation into a lug bolt hole 316.

In one or more embodiments, the enlarged portion or head of a threaded fastener 208, or a portion thereof, may form a spacer 304 to which a mount 204 may be attached. It is contemplated that a spacer 304 may be a separate element, such as a hollow cylinder or structure positioned between a wheel 120 and a mount 204. In such an embodiment, a threaded fastener 208 may extend from a mount 204 and through one or more spacers 304 (and a wheel 120) before engaging a hub 220. It is contemplated that a spacer 304 may be integral to or affixed to a mount 204 in some embodiments. A variety of spacers 304 may be used in any particular embodiment of the wheel mounted display.

Spacers 304 are advantageous in that they may be used to control the position the elements of a wheel mounted display 104, such that they do not come into contact with a wheel 120 or other vehicle components. To illustrate, longer spacers 304 may be used to position a wheel mounted display 104 further away from a wheel 120, while shorter spacers 304 may be used to position a wheel mounted display closer to a wheel 120. Referring back to FIG. 2 for example, appropriate spacers 304 may be used to avoid contact with a wheel's valve stem 224.

In the embodiment of FIG. 3A, spacers 304 are formed by the enlarged portion or head of the threaded fasteners 208. As can be seen, a spacer 304 may be a hollow structure for receiving a mount fastener 308. In FIG. 3A for example, the mount 204 is attached by via mount fasteners 308 which are inserted into the spacers 304. In one or more embodiments, a mount fastener 308 and its corresponding spacer 304 may be threaded so that they can be tightened relative to one another. A mount fastener 308 will typically also have an enlarged portion or head opposite its threaded portion to allow the mount fastener to apply pressure to a mount 204. A mount fastener 308 may be in the form of a bolt or screw in one or more embodiments.

Figure 3B:
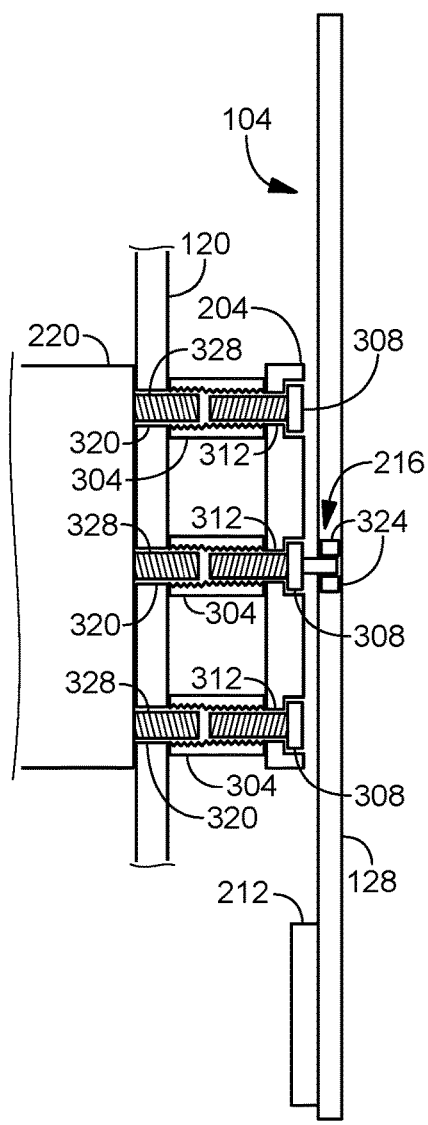
FIG. 3B is a side cross-sectional view of an exemplary wheel mounted display.

FIG. 3B illustrates another exemplary embodiment where a mount 204 may be attached to a wheel 120 with spacers 304. As can be seen, some hubs 220 may have lug bolts 328 extending therefrom. In such case, it is contemplated that a threaded fastener 208 need not be provided. Rather, a spacer 304 may be provided to form a union between lug bolts 328 and a mount 204. As shown in FIG. 3B for instance, a spacer 304 may engage a lug bolt 328 via a threaded opening and be tightened to clamp a wheel 120 to a hub 220.

Another threaded opening in the spacer 304 may receive a mount fastener 308 at an opposite end. As shown in the exemplary embodiment of FIG. 3B, a spacer 304 may comprise a first opening to receive a lug bolt 328, and a second opening to receive a mount fastener 308. In one or more embodiments, the openings may share a central axis and pass through the spacer 304. The openings may have the same or a distinct diameter, threading, or both to accommodate a variety of lug bolt 328 and mount fastener 308 combinations.

It is noted that spacers 304 need not be included in every embodiment of the wheel mounted display 104. This is because a mount 204 may be attached directly to a wheel 120 in some embodiments. It is contemplated that rubber or resilient washers or padding or the like may be positioned between a wheel 120 and a mount 204 in such case to prevent scratches or other damage to the wheel.

As can be seen from FIGS. 3A and 3B, one or more openings 312 may be in a mount 204 to allow one or more mount fasteners 308 to pass through the mount. The openings 312 will typically be positioned such that they are aligned with the lug bolt holes 316 or lug bolts 328 of a vehicle's hub 220, and the corresponding holes 320 in a vehicle's wheel 120.

Figure 4:
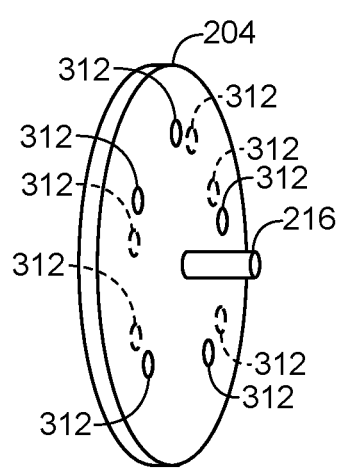
FIG. 4 is a perspective view of an exemplary mounting plate.

FIG. 4 illustrates a perspective view of an exemplary mount 204. As can be seen, openings 312 may be formed at various locations of a mount 204. As indicated by the broken lines, multiple sets of openings 312 may be provided to align with a variety of distinct hub and wheel combinations, namely the lug fasteners thereof. This allows a wheel mounted display 104 to be installed on a variety of vehicles, while also being easily removed when no longer in use or for installation on another vehicle, all without modification of any vehicle components.

Though shown as circular in shape, a mount 204 may be a variety of shapes in the various embodiments of the wheel mounted display 104. Typically, a mount 204 will be a planar structure however. It is contemplated that a mount 204 may be constructed from various materials, such as plastics, metals, composites or other materials.

FIGS. 2, 3A, and 3B also illustrate the rotation cancelling features of a wheel mounted display 104. In one or more embodiments, rotation cancellation will, at least in part, be accomplished by rotatably mounting a display 128 to a wheel 120. As shown in the embodiment of FIG. 2 for instance, a display 128 may be rotatably mounted to a mount 204 via a pivot 216. The display 128 is thereby rotatably attached to the wheel 120 via the mount 204. It is contemplated that one or more bearings 324 may be provided, such as at one or both ends of a pivot 216, to rotatably mount a display 128.

A wheel mounted display 104 may have its center of gravity arranged such that its presentation maintains an upright position even when a wheel 120 is in rotation. In one or more embodiments, this may be accomplished by weighting the display 128 such that one end of the display is heavier than its counterparts. As shown in FIG. 2 for example, one or more weights 212 may be integrated in or attached to a display 128 to ballast the display in an upright position.

One or more weights 212 may be attached at the end of a display 128, which is determined or desired to be the bottom end of the display. In combination with the rotatable mounting of the display 128, the increased weight at the bottom end of the display causes the display to maintain an upright position whereby the weighted end is maintained at the bottom of a wheel 120 even when the wheel is in rotation. It is contemplated that weights 212 need not be provided in all embodiments, as the components of a wheel mounted display 104 may be arranged such that one of its ends is heavier.

Figure 5:
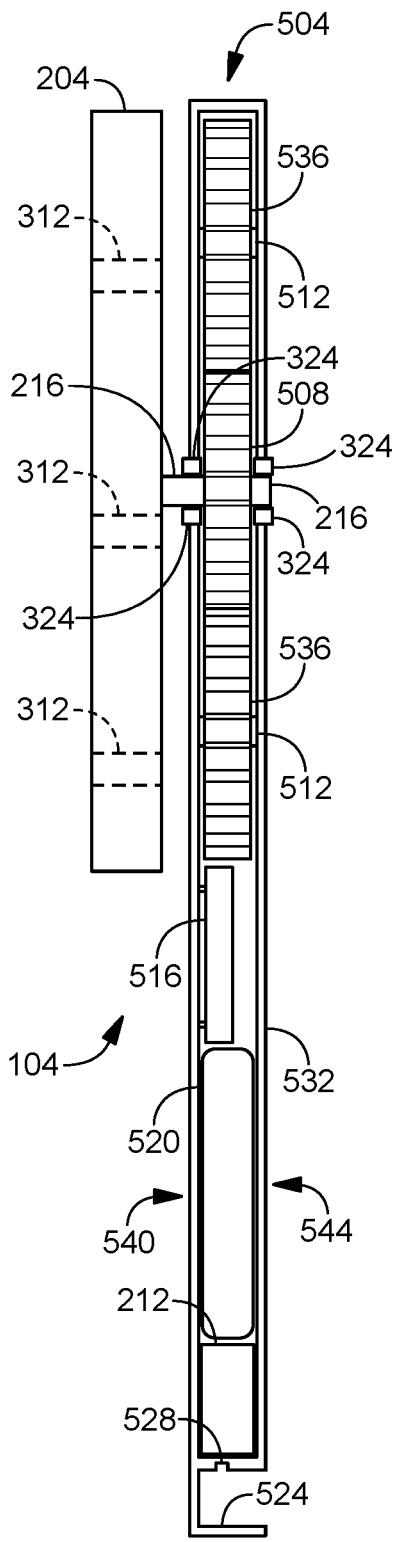
FIG. 5 is a side cross-sectional view of an exemplary wheel mounted display.
Figure 6:
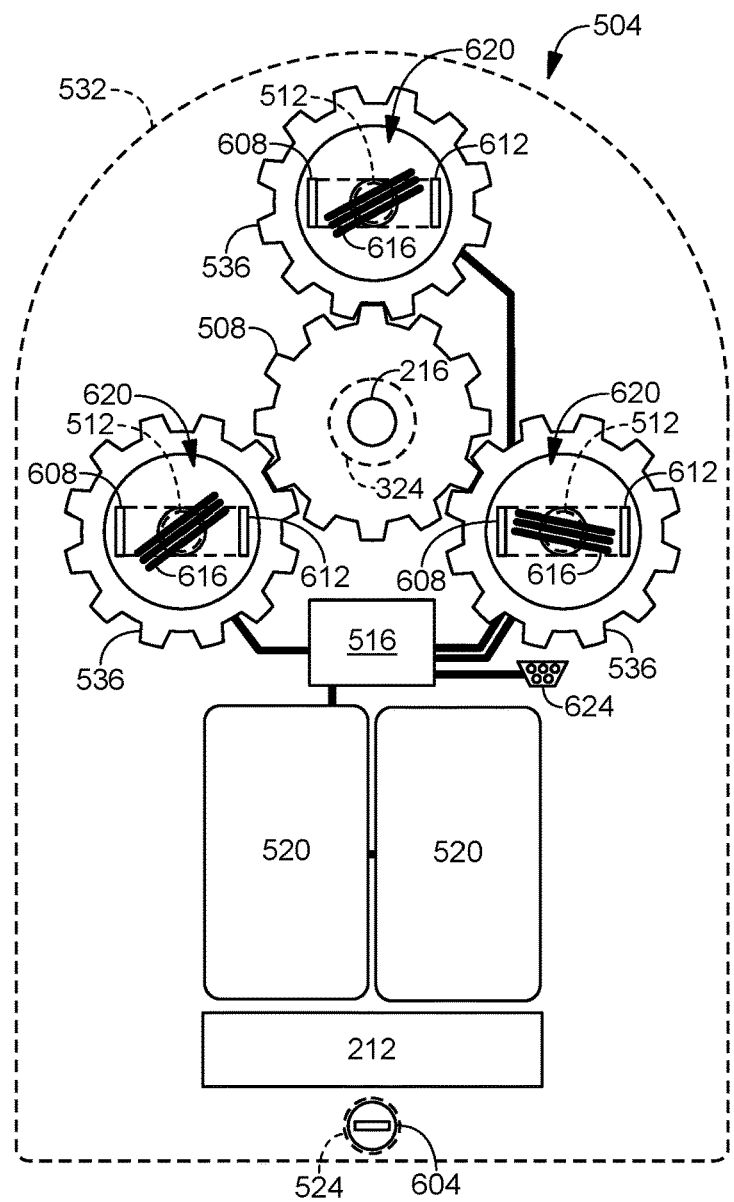
FIG. 6 is a front view of an exemplary wheel mounted display.

FIGS. 5 and 6 illustrate an embodiment of an exemplary wheel mounted display 104 including an electronics subsystem 504. Specifically, FIG. 5 illustrates a side cross-sectional view of, while FIG. 6 illustrates a front view. In an electronic embodiment, a wheel mounted display 104 may be capable of generating or utilizing electricity, such as to power a display.

As can be seen, an electronics subsystem 504 may comprise one or more controllers 516, batteries 520, drive mechanism 508, generators 536, or various subsets thereof. The components of an electronics subsystem may be housed within one or more enclosures 532. As shown in FIG. 5, an enclosure 532 may comprise a first side 540 and a second side 544. Typically, the first side 540 and second side 544 will be planar structures.

An enclosure 532 will typically serve to secure the components therein and may protect the components as well, such as from moisture and physical impacts. One or more weights 212 may be supported by an enclosure 532 that function as ballast to maintain the enclosure in an upright position. As disclosed above, it is contemplated that the enclosure 532 or components therein may be arranged to be heavier at its bottom end in some embodiments. Accordingly, weights 212 need not be provided in such embodiments.

In operation, rotation of a drive mechanism 508, powered by rotation of a vehicle's wheel, rotates one or more generators 536 to generate electricity. An enclosure 532 will typically be rotatably attached so as to permit it to maintain an upright position even as a vehicle's wheel rotates. As can be seen in FIG. 5 for example, the enclosure 532 may be rotatably attached to a pivot 216 via one or more bearings 324. This allows the pivot 216 to rotate, while the enclosure maintains an upright position. In such manner, rotation of the pivot 216 may drive rotation of the drive mechanism 508, which in turn, rotates one or more generators 536 to generate electricity.

As can be seen, a drive mechanism 508 may be attached to a pivot 216 and rotate therewith when a vehicle's wheel rotates. A generator 536 may be rotatable about an axle 512. An axle 512 may extend between a first side 540 and second side 544 of an enclosure 532. A drive mechanism 508 may engage one or more generators 536, such as through gears as shown in FIG. 6. Alternatively, a belt drive or other interlink mechanism may be used. It is contemplated that a drive mechanism 508 itself may also be a generator as well. In this manner, rotation of a drive mechanism 508 also drives or rotates one or more generators 536 to generate electricity.

Various types of generators 536 may be provided. In general, a generator 536 will convert mechanical energy into electricity. It is contemplated that a generator 536 may also or alternatively convert heat or light into electricity as well. A variety of generators 536 may be used with any particular wheel mounted display 104.

Figure 7:
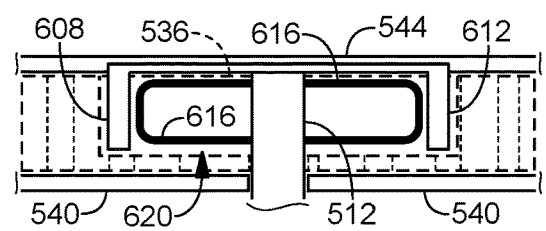
FIG. 7 is a side cross-sectional view of an exemplary generator.

As shown in FIGS. 5 and 6, the generators 536 convert mechanical energy into electricity by rotating a wire loop 616 in between two poles 608, 612 of a magnet, such as within a compartment 620 of a generator. FIG. 7 illustrates a side cross-sectional view of an exemplary generator 536. As can be seen, a wire loop 616 may be secured to an axle 512 of a generator 536 and be positioned between the poles 608, 612 of a magnet. In FIG. 6, the wire loop 616 and axle 512 rotate along with the generator 536, while the magnet and its poles 608, 612 are fixed in position via attachment to a side 544 of the electronics subsystem's enclosure.

As stated, the rotation of the wire loop 616 relative to the poles 608, 612 of the magnet generates electricity. In some embodiments, a magnet and its poles 608, 612 may rotate, such as by being attached to the compartment 620 of a generator 536, while a wire loop 616 is fixed, such as by being attached to one side 540, 544 of an enclosure.

Electricity from one or more generators 536 may be consumed, such as by a controller 516, used to charge one or more batteries 520, or both. In addition, electricity, as well as other signals, may be transmitted from an electronics subsystem 504 to a display (or other device) via one or more connection terminals or ports 624. It is noted that a port 624 need not be provided in all embodiments, since electricity, signals, or both may be transmitted through a direct wired connection, or wirelessly.

FIG. 8 illustrates an exemplary electronic wheel mounted display 104 having a display 128 attached thereto. A display 128 may be attached in various ways. For example, a display 128 may be secured by one or more screws, clips, clamps, or other locking mechanisms. In one or more embodiments, a display 128 will be removably attached to an electronics subsystem 504. This allows a display 128 and its electronics subsystem 504 to be readily removed, replaced, or serviced.

In one or more embodiments, a locking mechanism may comprise one or more tabs 812 and one or more corresponding slots 528, which may be moved to engage and disengage one another to respectively secure and release a display 128. Referring to FIG. 8, the tab 812 may be rotated to engage and disengage a slot 528 formed in a socket 524 in the electronics subsystem's enclosure 532. Specifically, the tab 812 extends from a bolt 604, whereby rotation of the bolt moves the tab to engage or disengage the slot 528. As can be seen from FIG. 6, a bolt 604 may be cylindrical, such as to facilitate its rotation, and may comprise one or more indentations or the like to aid in rotation. A socket 524 may have a corresponding shape, also to facilitate rotation of the bolt 604. When the bolt 604 is rotated such that its tab 812 engages a slot 528, the bolt holds the display 128 in position relative to the electronics subsystem 504, such as shown in FIG. 8.

It is contemplated that a bolt 604 may be rotated, pressed, or otherwise actuated to extend and retract a tab 812 in one or more embodiments. In addition, a tab 812 may extend out from and retract into a bolt 604 in some embodiments. In addition, it is contemplated that a key may be required to secure and release a display 128 in one or more embodiments. For example, a key may be required to rotate or otherwise actuate the bolt 604 of a locking mechanism, or to otherwise cause one or more tabs 812 to engage one or more slots 528.

A locking mechanism may also include one or more hooks 804, catches, holds, or the like in one or more embodiments. In general, a hook 804 will engage a portion of an electronic subsystem 504, such as its enclosure 532 to secure a display 128 thereto. As shown in FIG. 8 for example, the hook 804 secures the display 128 to a top end of the enclosure 532, while a tab 812 secures the display to a bottom end of the enclosure. It is contemplated that a hook 804, catch, hold, or the like may rotate or otherwise move to engage or disengage an enclosure 532. In the embodiment of FIG. 8, the hook 804 is fixed while the tab 812 and bolt 604 are rotatable to allow releasable attachment of the display 128 to the enclosure 532.

A display 128 may comprise an LED, LCD, OLED, E-INK, or other screen, and may be connected to an electronics subsystem 504 such as disclosed above. As can be seen, one or more cables 808 may connect a display 128 to an electronics subsystem 504, such as to a controller 516 thereof, in wired embodiments. A cable 808 may provide a direct connection, or may be connected to a port of an electronics subsystem 504. It is contemplated that a display 128 may have its own port which automatically connects to a port of an electronics subsystem 504 when the display is attached thereto.

FIG. 9 illustrates another electronic embodiment of a wheel mounted display 104. As can be seen, a display 128 may comprise one or more lighting devices 904 that provide illumination. A lighting device 904 may comprise one or more LEDs or other lighting elements for example. It is contemplated that a lighting device 904 or individual lighting elements thereof may be individually controlled to emit light of varying luminosity, color, or both such as by a controller 516. A lighting device 904 may blink, display information, display animations, provide illumination, or the like in this manner.

A screen 908 may be positioned in front of a lighting device 904 in some embodiments to be illuminated by the lighting device. It is contemplated that a screen 908 may be static or dynamic. For example, a screen 908 may be a light transmissive panel upon which a presentation is printed or otherwise applied. Alternatively, a screen 908 may be an LCD or E-INK screen capable of providing a static or dynamic presentation that is backlit or otherwise illuminated by a lighting device 904.

As described above, electricity may be provided by one or more generators 536, batteries 520, or both. It is noted that in some embodiments, a wheel mounted display 104 may comprise only one or more generators 536 or only one or more batteries 520 but not both. In embodiments only with generators 536, illumination or other electronically provided presentations may only be shown while a vehicle's wheels are in rotation. In embodiments, only with batteries 520, illumination or other electronically provided presentations may only be shown while the batteries are adequately charged.

Figure 10:
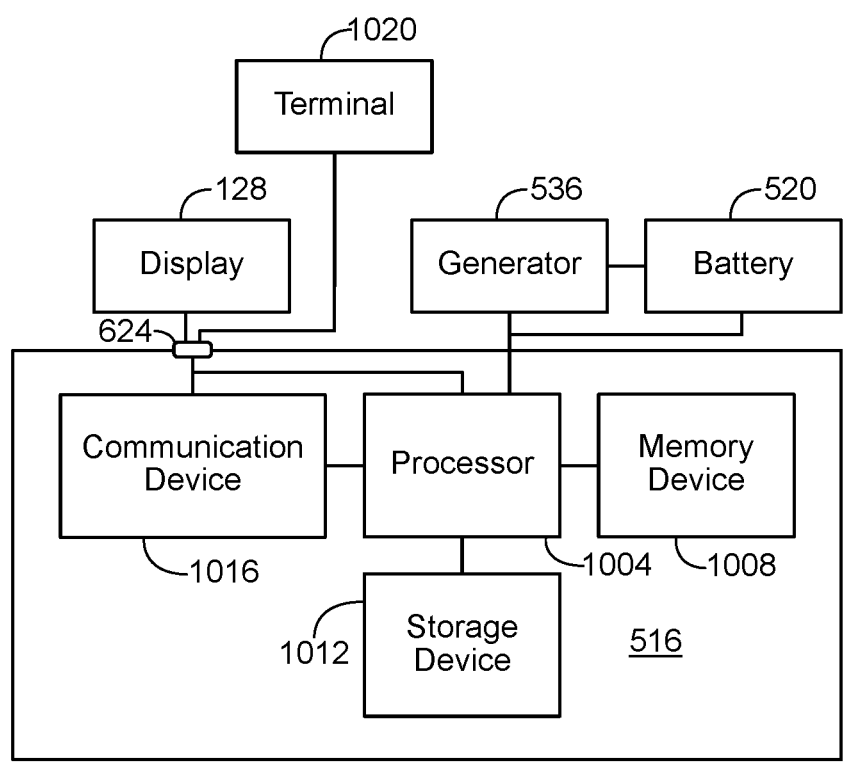
FIG. 10 is a block diagram illustrating an exemplary controller.

FIG. 10 is a block diagram illustrating components of an exemplary controller 516. In one or more embodiments, a controller 516 may govern or control the charging of one or more batteries 520, such as to ensure proper charging of the same. A controller 516 may also or alternatively, distribute electricity to a display, such as via a port 624. In addition, a controller 516 may control operation of electronic components of a display, such as lighting or screens thereof. Control signals or other communication may occur via a port 624 as well, as stated above.

A controller 516, may comprise one or more processors 1004, storage devices 1012, communication devices 1016, memory devices 1008, or various subsets thereof. A processor 1004 will typically be a microprocessor or the like capable of executing instructions to provide the functionality disclosed herein. A processor 1004 may include or utilize a memory device 1008, which may be in the form of cache memory, RAM, or other memory.

A storage device 1012 may comprise flash memory or other non-transient storage medium (excluding carrier waves and signals), and may be used to store the presentation(s) to be shown on a display 128. A storage device 1012 may also store instructions executable by a controller 516 to control the operation of a display. Alternatively, these instructions may be hardwired into a processor 1004 of the controller 516.

A communication device may be used to receive presentations for storage on a storage device 1012, or to communicate with a display 128 or other device. It is contemplated that a communication device 1012 may communicate via a wired or wireless connection, such as described above. In one or more embodiments, a controller 516 may be controlled via its communication device 1016, such as with a terminal 1020 in communication therewith. Presentations may also be received via a communication device 1016 from one or more terminals 1020. Some exemplary terminals 1020 include smartphones, tablets, laptops, desktops, or other computing devices.

Once received, a presentation may be transmitted to a display 128, such as by a processor 1004. In addition, a processor 1004 may control lighting devices or lighting elements of a display 128. A processor 1004 may be configured to show presentations and control the lighting thereof 128 according to a predefined sequence, which may be set at a terminal 1020 and transmitted to the processor 1004.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A wheel mounted display that mounts to a wheel of a vehicle comprising:
   a planar mount comprising a plurality of holes, wherein the plurality of holes are aligned with lug bolt holes in the wheel;
   a plurality of spacers comprising a first end, a second end, and one or more threaded portions, wherein when the wheel mounted display is attached to the wheel the first end of each of the plurality of spacers is secured to the wheel at the lug bolt holes via the one or more threaded portions and the second end of each of the plurality of spacers is secured to the planar mount at the plurality of holes;
   a pivot extending from the planar mount;
   a display that shows one or more presentations, wherein the display is rotatably attached to the planar mount by the pivot; and
   one or more weights that ballast the display to an upright position.

2. The wheel mounted display of claim 1, wherein the display is sized to cover substantially all of the wheel.

3. The wheel mounted display of claim 1 further comprising one or more batteries.

4. The wheel mounted display of claim 1, wherein the display comprises one or more screens.

5. The wheel mounted display of claim 1, wherein the display comprises one or more lighting devices.

6. The wheel mounted display of claim 1, wherein the plurality of spacers are secured to the planar mount via the one or more threaded portions.

7. The wheel mounted display of claim 1 further comprising one or more generators rotatably coupled to the pivot by a linkage, wherein the one or more generators rotate about an axle and axis distinct from the pivot.

8. A wheel mounted display that mounts to a wheel of a vehicle comprising:
   a mount comprising one or more holes aligned with one or more lug bolt holes of the wheel;
   one or more spacers comprising a first end, a second end, and one or more threaded portions, wherein when the wheel mounted display is attached to the wheel the first end of the one or more spacers is secured to the wheel at the one or more lug bolt holes via the one or more threaded portions and the second end of the one or more spacers is secured to the mount;
   a display that shows one or more presentations, the display comprising a top end and a bottom end; and
   a pivot extending from the mount, wherein the pivot rotatably attaches the display to the mount.

9. The wheel mounted display of claim 8, wherein the one or more spacers are secured to the mount via the one or more threaded portions.

10. The wheel mounted display of claim 8, wherein the one or more spacers comprise one or more second threaded portions comprising threading that is distinct from the one or more threaded portions.

11. The wheel mounted display of claim 8 further comprising one or more batteries.

12. The wheel mounted display of claim 11, wherein the display comprises one or more lighting devices powered by the one or more batteries.

13. The wheel mounted display of claim 12, wherein the display is sized to cover substantially all of the wheel.

14. The wheel mounted display of claim 11, wherein the display comprises one or more screens powered by the one or more batteries.

15. A method for providing one or more presentations at a wheel of a vehicle with a wheel mounted display comprising:
   providing a display for showing the one or more presentations, wherein the display comprises a top end and a bottom end and is heavier at the bottom end;
   providing a mount, the mount comprising a plurality of holes that are aligned with one or more lug bolt holes in the wheel, wherein the display is rotatably attached to the mount; and
   providing one or more spacers comprising a first end, a second end, and one or more threaded portions, wherein when the mount is attached to the wheel the first end of the one or more spacers is secured to the wheel at the one or more lug bolt holes via the one or more threaded portions and the second end of the one or more spacers is secured to the mount.

16. The method of claim 15, wherein the display is sized to cover substantially all of the wheel.

17. The method of claim 15 further comprising providing one or more batteries that are charged by one or more generators, the one or more generators being rotatably coupled to the pivot by a linkage, wherein the one or more generators rotate about an axle and axis distinct from the pivot.

18. The method of claim 15, wherein the display comprises one or more lighting devices.

19. The method of claim 15, wherein the display comprises one or more screens.

20. The method of claim 15, wherein the one or more spacers are secured to the mount via the one or more threaded portions.

\* \* \* \* \*